United States Patent
Salkhi

(10) Patent No.: US 7,148,844 B2
(45) Date of Patent: Dec. 12, 2006

(54) GLOBAL POSITIONING APPARATUS AND METHOD FOR USING A TEMPERATURE COMPENSATED OSCILLATOR TO PERFORM A POSITION FIX

(75) Inventor: Amin Salkhi, Fremont, CA (US)

(73) Assignee: SiRF Technology, Inc., San Jose, CA (US)

( * ) Notice: Subject to any disclaimer, the term of this patent is extended or adjusted under 35 U.S.C. 154(b) by 0 days.

(21) Appl. No.: 10/263,333

(22) Filed: Oct. 2, 2002

(65) Prior Publication Data

US 2003/0128157 A1    Jul. 10, 2003

Related U.S. Application Data

(60) Provisional application No. 60/326,898, filed on Oct. 2, 2001.

(51) Int. Cl.
*G01S 5/14* (2006.01)
(52) U.S. Cl. .............................. 342/357.12; 342/357.15
(58) Field of Classification Search ........... 342/357.15, 342/357.12
See application file for complete search history.

(56) References Cited

U.S. PATENT DOCUMENTS

| | | | | |
|---|---|---|---|---|
| 5,592,173 A | * | 1/1997 | Lau et al. | 342/357.12 |
| 5,594,453 A | * | 1/1997 | Rodal et al. | 342/357.15 |
| 5,654,718 A | * | 8/1997 | Beason et al. | 342/357.15 |
| 5,854,605 A | * | 12/1998 | Gildea | 342/357.03 |
| 5,864,315 A | * | 1/1999 | Welles et al. | 342/357.12 |
| 5,893,044 A | * | 4/1999 | King et al. | 701/214 |
| 5,940,027 A | * | 8/1999 | Forseth et al. | 342/357.06 |
| 6,445,341 B1 | * | 9/2002 | Hasegawa | 342/357.13 |

FOREIGN PATENT DOCUMENTS

EP    1130415 A2 *  3/2001

* cited by examiner

*Primary Examiner*—Gregory C. Issing
(74) *Attorney, Agent, or Firm*—Edward C. Kwok; MacPherson Kwok Chen & Heid LLP

(57) ABSTRACT

A global positioning receiver unit utilizes a temperature compensated oscillator and a unit controller. The temperature compensated oscillator generates a clock signal, and the unit controller is configured to track GPS time based on the clock signal while the receiver unit is in a sleep state. The unit controller is further configured to perform a position fix based on a satellite signal and the GPS time tracked by the unit controller.

12 Claims, 4 Drawing Sheets

GLOBAL POSITIONING APPARATUS AND METHOD FOR USING A TEMPERATURE COMPENSATED OSCILLATOR TO PERFORM A POSITION FIX

CROSS-REFERENCE TO RELATED APPLICATION

This document claims priority to and the benefit of the filing date of U.S. provisional application No. 60/326,898, entitled "Reducing Time to First Fix in GPS Systems Using Temperature Compensated Real Time Clock," and filed on Oct. 2, 2001, which is incorporated herein by reference.

BACKGROUND OF THE INVENTION

1. Field of the Invention

The present invention generally relates to the Global Positioning System (GPS) and, in particular, to a global positioning apparatus and method for using a temperature compensated oscillator to track GPS time during a sleep state and for performing a position fix based on a satellite signal and the tracked GPS time.

2. Related Art

The Global Positioning System (GPS) is currently a collection of twenty-four earth-orbiting satellites. Each of the GPS satellites travels in a precise orbit about 11,000 miles above the earth's surface. A GPS receiver locks onto at least three of the satellites to determine its precise location. Each satellite transmits a signal modulated with a unique pseudo-noise (PN) code. Each PN code is a sequence of 1023 chips that are repeated every millisecond (ms) consistent with a chip rate of 1.023 megahertz (MHz). Each satellite transmits at the same frequency. For civil applications, the frequency is known as L1 and is 1575.42 MHz. The GPS receiver receives a signal that is a mixture of the transmissions of the satellites that are visible to the receiver. The receiver detects the transmission of a particular satellite by correlating the received signal with shifted versions of the PN code for that satellite. If the level of correlation is sufficiently high so that there is a peak in the level of correlation achieved for a particular shift and PN code, the receiver detects the transmission of the satellite corresponding to the particular PN code. The receiver then uses the shifted PN code to achieve synchronization with subsequent transmissions from the satellite.

GPS employs a unique time keeping system. GPS time is kept in terms of seconds and weeks since Jan. 6, 1980. There are 604,800 seconds per week. Therefore, GPS time is stated in terms of a time of week (TOW) and a week number. TOW ranges from 0 to 604800, corresponding to the number of seconds in a week. The week number started with week zero on Jan. 6, 1980 and is currently in excess of one thousand weeks. The TOW can have a fractional part, particularly when oscillators provide a resolution of $1/32,768^{th}$ of a second (oscillation frequency of 32 kiloHertz, or kHz) or when the GPS time is computed from range measurements relative to a specific clock epoch, and can have accuracy on the order of a few tens of nanoseconds. GPS time is fundamental to the GPS system.

During the initial determination of position of the GPS receiver unit, a "cold start" process is initiated whereby the GPS receiver unit searches for all satellites over a wide range of possible frequencies since the GPS receiver unit begins the acquisition process without knowledge of GPS time, GPS position or ephemeris data for the GPS satellite orbits. In some situations, almanac data is also unknown for the GPS satellites. Eventually, after many seconds, at least four satellite signals are acquired. The satellites' PN encoded signals identify each of the satellites, and each satellite transmits precise orbital information (orbital location as a function of GPS time) for that satellite, known as ephemeris data.

If some information is known prior to acquisition, the time to acquire sufficient information from the GPS satellites for navigation can be reduced. For example, a "warm start" process may be used if almanac data, approximate GPS time and approximate receiver position allow approximate satellite locations and Doppler shifts to be calculated. A "hot start" process may be used if the ephemeris data, approximate GPS time and approximate receiver position are known so that approximate satellite locations and Doppler shifts can be calculated, whereby the time to collect ephemeris data can be avoided. However, a complete six-second sub-frame of data from at least one satellite is normally required in order to establish time with sufficient accuracy to compute a navigation solution (position).

The GPS receiver unit determines its distance from each satellite by determining the code phase of the transmission from each satellite. The code phase (CP) is the delay, in terms of chips or fractions of chips that a satellite transmission experiences as it travels the approximately 11,000 mile distance from the satellite to the receiver unit. At each satellite, the time of transmission of each PN chip is controlled to within a few nanoseconds. Consequently, knowledge of precise GPS time allows the GPS receiver unit to know exactly which chip of a satellite's waveform is being transmitted at any given time. If the arrival of a given chip at a receiver unit is measured relative to a local timing epoch, such as the T20, then the propagation time of that chip from the satellite to the GPS receiver unit can be measured as accurately as GPS time at that T20 epoch is known. If the propagation times from each of four satellites are measured relative to the same T20 epoch, then the GPS receiver unit can solve for the location of the receiver in three-dimensional space, along with the error in the value of GPS time at the reference T20.

The GPS receiver unit precisely determines the distance to the satellite by multiplying the time delay by the velocity of the transmission from the satellite. The GPS receiver unit also knows the precise orbits of each of the satellites. Updates of the locations of the satellites are transmitted to the receiver by each of the satellites. This is accomplished by modulating a low frequency (50 Hz) data signal onto the PN code transmission form the satellite. The data signal encodes the time-dependent positional information for the satellite and anytime errors in its on-board clock in the ephemeris data sub-frames. Precise time of each satellite's transmission is given in each six-second data sub-frame relative to a reference chip at the start of the next sub-frame.

The receiver unit uses the estimated range from a satellite to define a sphere around the satellite upon which the receiver unit must be located. The radius of the sphere is equal to the range to the satellite the receiver unit has determined from the code phase. The receiver performs this process for at least three satellites. The receiver derives its precise location from the points of intersection among the at least three spheres it has defined. Measurements from three satellites are sufficient if the receiver unit knows the altitude at its location. When the altitude is unknown, measurements from four satellites are required so that altitude can also be determined, along with latitude, longitude and the error in the local clock measurement epoch (e.g., GPS time at the T20 epoch).

The detection of the signals from each satellite can be accomplished in accordance with a GPS signal detector that is disclosed in, for example, but not limited to, U.S. patent application entitled "Signal Detector Employing Coherent Integration," having Ser. No. 09/281,566, filed on Mar. 30, 1999, which is incorporated herein by reference. A signal detector as disclosed therein may use a correlation mechanism, for example, a matched filter, and a coherent integration scheme in which to detect the appropriate satellite signals.

Once the satellite signals are detected, the low frequency 50 Hz data that is modulated onto the PN code signal received from the satellite is decoded to determine the precise location of the GPS receiver unit. In the past, this location determination process often required several seconds to complete. Unfortunately, these conventional schemes typically run continually, thus consuming valuable processor resources, particularly a limited power source, if the GPS receiver unit is portable. Portable GPS receiver units may be designed such that selected components may be shut off, or powered down, during periods when the user is not querying the GPS receiver unit for location information. When the user (or an automated process) queries the GPS receiver unit, the GPS receiver unit reactivates the powered down components and reacquires satellite data to determine the current location. If the user has not significantly moved, and/or if the shut down period has been sufficiently short, it may be possible to reacquire the previous satellite signals and have nearly immediate correlation of the code phase data (rather than the several seconds to minutes associated with the hot, warm or cold start procedures). Nearly immediate correlation of the code phase data saves several seconds, thereby saving a substantial amount of the limited power source available in a portable GPS receiver unit.

However, such reacquisition of the satellite signals with nearly immediate correlation of the code phase data requires precise time keeping during the period that the receiver is off. More particularly, the GPS oscillator and timing system normally must maintain accuracy of the various clocking signals in the GPS receiver unit to better than 0.5 milliseconds (ms) to avoid losing track of which PN code period within the overall GPS signal structure the receiver expects to receive at reacquisition. This 0.5 ms criterion corresponds to one half of a 1 ms code period. In addition, movement of the GPS receiver unit introduces error that may be equated to timing of the PN code signals. If the accuracy of the clocking signals plus the error introduced by movement of the GPS receiver unit can be maintained to within approximately ±0.5 ms of the incoming PN code signals, the time consuming and power consuming process of determining location using the hot, warm or cold start procedures may be avoided because the GPS receiver unit matching filters can immediately lock onto the four previously acquired satellite PN code signals and know which PN code period of the signal structure has been acquired. Otherwise, the hot, warm or cold start procedures must be used, depending on the prior information (e.g., almanac, ephemeris, GPS time, receiver position) that has been preserved while the receiver was off.

Typically, a conventional real time clock (RTC) circuit may be used to maintain rough GPS time while the rest of the GPS circuitry is off. Typical RTC circuits may maintain accuracy of a few seconds over extended periods. Such accuracy is adequate for hot and warm starts. However, the accuracy of a conventional real time clock degrades rapidly due to poor stability and temperature characteristics of typical low cost, low power RTC circuits. Therefore, even after a very brief time, a cold start is often required.

Maintaining accuracy of the various clocking signals in the GPS receiver unit to within ±0.5 ms (one half of a 1 ms code period) is not possible with a conventional GPS oscillator and timing system if the oscillator is powered down between navigation updates. However, since the GPS oscillator and the associated timing system consume significant power, powering down these components is very desirable in a portable GPS receiver unit to conserve power resources.

Therefore, it is desirable to have a power saving scheme for powering down a GPS receiver unit and for enabling the GPS receiver unit to precisely maintain GPS time during the power down period such that new immediate collection of code phase data is possible subsequent to the power down process. In particular, it is desirable to power down the GPS oscillator and the associated clocking circuitry while preserving accurate clocking information such that approximately ±0.5 ms accuracy is maintained over the power down period.

SUMMARY OF THE INVENTION

Generally, the present invention pertains to a global positioning receiver unit and method for utilizing a temperature compensated oscillator to track GPS time during a sleep state and for performing a position fix based on a satellite signal and the tracked GPS time.

A global positioning receiver unit in accordance with an exemplary embodiment of the present invention uses a temperature compensated oscillator and a unit controller. The temperature compensated oscillator generates a clock signal, and the unit controller is configured to track GPS time based on the clock signal while the receiver unit is in a sleep state. The unit controller is further configured to perform a position fix based on a satellite signal and the GPS time tracked by the unit controller.

A method for use with a global positioning receiver unit in accordance with an exemplary embodiment of the present invention can be broadly conceptualized by the following steps: generating a clock signal via a temperature compensated oscillator; tracking GPS time based on the clock signal while the receiver unit is in a sleep state; acquiring a satellite signal; and performing a position fix based on the satellite signal and the GPS time tracked in the tracking step.

Various features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

Figure 1:
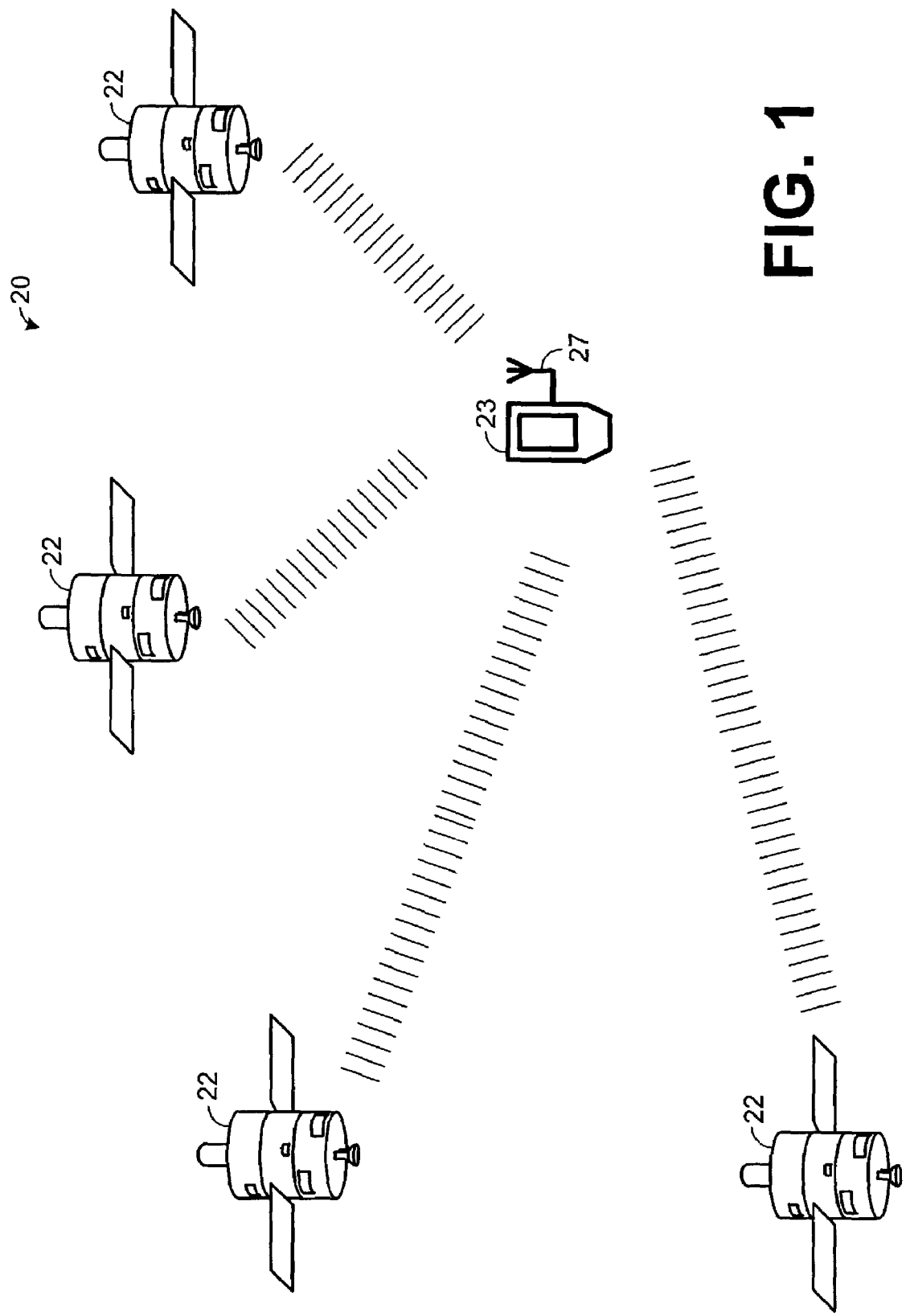
FIG. 1 is a block diagram illustrating a global positioning system (GPS).

FIG. 1 depicts a global positioning system (GPS) 20 having a plurality of GPS satellites 22 and a GPS receiver apparatus or unit 23. Each of the satellites 22 orbits the Earth and continuously transmits signals that may be received by an antenna 27 of the receiver unit 24. The receiver unit 23 is configured to analyze data received from at least three of the orbiting satellites 22 and to employ triangulation techniques, based on the information included in the received signals, to discover the unit's position or location.

Figure 2:
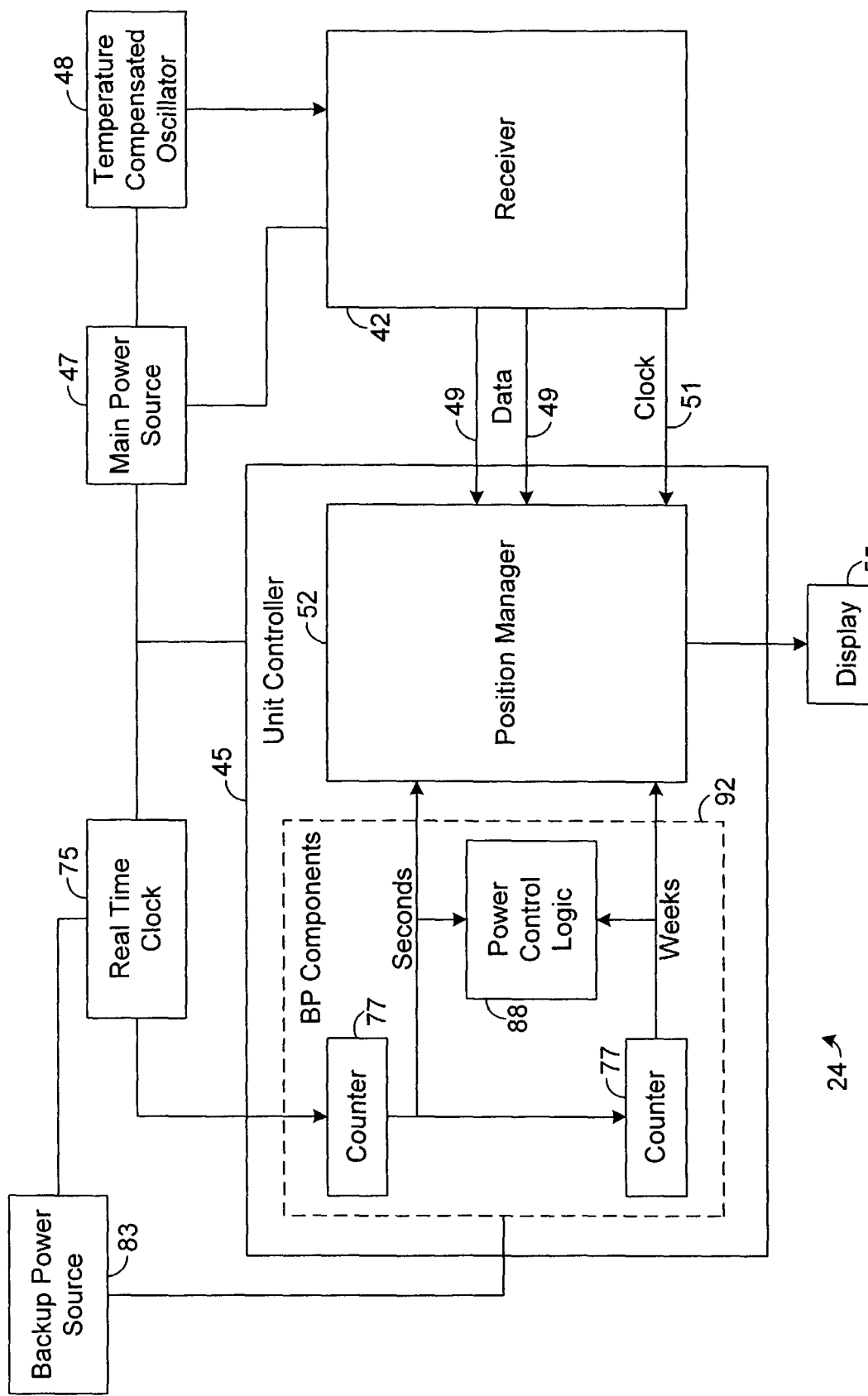
FIG. 2 is a block diagram illustrating an exemplary embodiment of a GPS receiver unit.

FIG. 2 depicts a conventional GPS receiver unit 24. The receiver unit 24 comprises a receiver 42 and a unit controller 45. Both the receiver 42 and the unit controller 45 are powered via a main power source 47, such as a battery, for example, and the receiver 42 is clocked by a temperature compensated oscillator 48. The oscillator 48 compensates for temperature changes such that the frequency of the oscillator 48 remains substantially constant over a wide temperature range. As an example, the temperature compensated oscillator 48 may be a Rakon IT5305E TCXO, which runs precisely at 24.5535 megaHertz (MHz) with a drift of 1 part-per-million (PPM) over temperature.

A GPS clocking signal 51 derived via the output of the oscillator 48 is provided to the unit controller 45 to provide synchronization between the unit controller 45 and the receiver 42. Note that the unit controller 45 and the receiver 42 may each be implemented via an integrated circuit (IC) chip. In this regard, each of the components of the unit controller 45 may reside within a single IC chip (not shown), and each of the components of the receiver 42 may reside in a different IC chip (not shown).

The receiver 42 is configured to receive a GPS satellite signal and to demodulate the received signal. The receiver 42 performs an analog-to-digital (A/D) conversion on the demodulated signal and provides the digital data defined by such signal to the unit controller 45 via a two-bit signal 49, although other numbers of bits may be employed in other examples. The unit controller 45 then processes the digital signal received from the receiver 42 to determine the position of the receiver unit 24.

In this regard, the satellite signal comprises information, referred to as ephemeris data, indicative of orbital positions of satellites 22 (FIG. 1). The ephemeris data is a function of GPS time, and the ephemeris data transmitted by each satellite 22 is normally updated every hour. Each frame of ephemeris data is correlated with time data indicative of the GPS time at which the correlated frame was transmitted from the transmitting satellite 22. A position manager 52 of the unit controller 45 may lock onto the incoming demodulated satellite signal and collect, from the satellite signal, a sufficient amount of time data and ephemeris data to determine the positions of satellites 22 that are in view of the unit 24.

Moreover, the incoming satellite signal also comprises PN code that may be used by the position manager 52 to determine the transmission delays between the satellites 22 and the receiver unit 24. Based on these delays, the position manager 52 can determine the distance between the receiver unit 24 and the satellites 22 via well-known techniques. After determining the position and range of at least three satellites 22, the position manager 52 may employ triangulation techniques to determine the receiver unit's GPS position. This position may then be displayed via a display 55 of the GPS receiver unit 24. Note that the position manager 52 may be implemented in hardware, software, or any combination thereof.

Once the ephemeris data is collected by the position manager 52, the position manager 52 may store the ephemeris data, thereby eliminating the need of the position manager 52 to collect the ephemeris data from the incoming satellite signal. Moreover, the stored ephemeris data, rather than the ephemeris data being received by the unit 24, may be used to perform a position fix (i.e., to determine the current location or position of the GPS receiver unit 24). In this regard, the stored ephemeris data may be used to determine the position of the satellites 22 based on the timing information extracted from the incoming satellite signal. In some embodiments, it can take approximately eighteen to thirty-six seconds to acquire all of the ephemeris data of an incoming GPS satellite signal and less than ten seconds to acquire the time data of the incoming GPS satellite signal. Thus, by storing and reusing the ephemeris data, it is possible to significantly reduce the amount of time required to perform a position fix.

Furthermore, if the GPS receiver unit 24 is capable of precisely tracking GPS time, the amount of time required to perform a position fix can be further reduced. In this regard, precisely tracking GPS time eliminates the need to acquire time data from the satellite signal being processed by the position manager 52, thereby avoiding the overhead associated with obtaining timing information from the incoming satellite signal. Indeed, if sufficient time data and ephemeris data are already known by the position manager 52, the position manager 52 can perform a position fix once the manager 52 acquires the satellite signal. Thus, there is no need for the position manager 52 to wait until the time data and the ephemeris data are extracted from the incoming satellite signal before performing the position fix, thereby reducing the amount of time required to perform the position fix. Moreover, the unit controller 45 may be configured to precisely track GPS time based on the output of a real time clock (RTC) 75 time so that the unit 24 may perform a position fix without waiting for time data to be extracted from the satellite signal being processed by the unit 24.

However, if the GPS time tracked by the unit 24 is to be used to perform a position fix in lieu of the time data of the incoming satellite signal, it is desirable for the GPS time to be tracked to an accuracy of about 0.25 ms of the incoming PN code signals. Note that the 0.25 ms threshold assumes that inaccuracy due to movement of the unit 24 will be less than 0.25 ms, thereby resulting in an overall inaccuracy no greater than about 0.5 ms. In some instances, the accuracy of the GPS time, as tracked by the position manager 52, may degrade beyond 0.25 ms, and, in such instances, the position manager 52 is configured to perform a position fix based on time data extracted from the incoming satellite signal. Thus, in such instances, the position manager 52 waits for the time data to be extracted from the incoming satellite signal before performing the position fix.

As shown by FIG. 2, the clock signal output by the real time clock 75 is passed through a plurality of counters 77 that divide the frequency of the clock signal into units of time tracked by the unit controller 45. For example, one of the counters 77 divides the frequency of its input clock signal such that its output indicates GPS seconds, and another of the counters 77 divides the frequency of its input clock signal such that its output indicates GPS weeks.

It is generally desirable for the unit 24 to continue tracking GPS time even when the unit 24 is transitioned to a sleep state. Indeed, by precisely tracking GPS time during a sleep state, it is possible to perform a position fix when the unit 24 is later powered up without waiting for the position manager 52 to extract time data from the incoming satellite signal. Therefore, the time from power up to the first subsequent position fix can be significantly reduced if the GPS time tracked by the unit controller 45 is sufficient for performing the position fix within acceptable margins (e.g., has an accuracy better than approximately 0.25 ms).

Moreover, the components of the unit 24 that track GPS time are electrically coupled to a backup power source 83, which powers such components when the unit 24 is in a sleep state or is "sleeping." Note that when the unit 24 transitions out of the sleep state or, in other words, transitions to an active state, the main power source 47 powers the components of the receiver unit 24. However, when the unit 24 transitions to a sleep state, the main power source 47 is switched off, and the backup power source 83 provides power to select components. In particular, the backup power source 83 provides power to at least the components used for tracking GPS time. In this regard, the backup power source 83 provides backup power to at least the real time clock 75, counters 77, and power control logic 88, which will be described in more detail below. Note that the components of the unit controller 45 powered by the backup power source 83 shall be collectively referred to hereafter as "backup power (BP) components 92."

The backup power source 83 may comprise a low voltage battery, such as a Panasonic CR2477 3V battery, and to increase the life of the backup power source 83, the real time clock 75 may be a low power oscillator having a crystal, such as a Fox Electronics NC15 series 32768 Hz crystal, that oscillates at a frequency lower than the frequency of the temperature compensated oscillator 48. Indeed, in one embodiment, the real time clock 75 draws about 1 microwatt (µW) of power and may oscillate at 32768 Hz, whereas the temperature compensated oscillator 48 draws about 5 milliwatts (mW) of power and oscillates at 24.5535 MHz. Note that an example of a low power RTC stand-alone device is the Dallas Semiconductor DS17285, which operates at about 1.5 µW. An integrated RTC oscillator can have similar power consumption.

However, the low power real time clock 75 may be subject to drift as the temperature of the clock 75 changes. In particular, the temperature of the electronic components, including that of the real time clock 75 of the receiver unit 24, tends to drastically decrease for the first few minutes after the unit 24 transitions to a sleep state, causing significant drift in the real time clock 75. As the real time clock 75 drifts, the accuracy of the GPS time being tracked by the position manager 52 decreases. Indeed, for one implementation according to the configuration shown by FIG. 2, it has been shown that after about three minutes from the time that the unit 24 transitions to a sleep state, the accuracy of the GPS time tracked by the position manager 75 degrades to less than 0.25 ms accuracy. For such an implementation, if the duration of the sleep state is less than approximately three minutes, the position manager 52 (after transition to an active state) performs a first position fix based on the GPS time maintained by the unit controller 45. However, if the duration of the sleep state is greater than approximately three minutes, the position manager 52, before performing the first position fix, acquires time data from the incoming satellite signal and uses this time data, in lieu of the GPS time maintained by the position manager 52, to perform the first position fix. As a result, the position manager 52 waits for time data to be extracted from the incoming satellite signal before performing the first position fix, thereby lengthening the time between power up and the first position fix.

Note that it is possible for the receiver unit 24 to operate in a tracking mode whereby the receiver unit 24 automatically and periodically performs a position fix and stores data indicative of each of the position fixes. This data may be used to define or show a route of a person or vehicle carrying the receiver unit 24. To conserve power, it is generally desirable for the unit 24 to transition to a sleep state between successive position fixes. The transitioning of the unit 24 into and out of sleep states may be controlled by power control logic 88.

In this regard, after a position fix is performed, the power control logic 88 initiates a sleep state or, in other words, puts the unit 24 to sleep in order to conserve power before the next position fix. To enable the unit 24 to perform the next position fix without having to acquire time data from the incoming satellite signal, the power control logic 88 causes the unit 24 to wake-up (i.e., transition to an active state) before the drift of the real time clock 75 causes the accuracy of the GPS time being tracked by the unit controller 45 to fall below a specified threshold (e.g., ±0.25 ms). In the embodiment described above where such a threshold is passed after about three minutes, the power control logic 88 awakens the unit 24 or, in other words, transitions the unit 24 to an active state prior to expiration of approximately three minutes from initiation of the current sleep state.

Upon power-up, the position manager 52 performs a position fix and stores data indicative of this fix. Note that such a position fix may be performed without acquiring time data from the incoming satellite signal as the accuracy of the GPS time tracked by the unit controller 45 should be within acceptable margins. After performing the position fix, the power control logic 88 again puts the unit 24 to sleep, and the aforedescribed process is repeated. Note that it is possible for the duty cycle of the unit 24 to be longer than three minutes. However, in such an embodiment, the accuracy of the GPS time being maintained by the unit controller 45 may fall below an acceptable level, as previously described. Thus, for a duty cycle longer than three minutes, the position manager 52 acquires time data from the incoming satellite signal, resulting in a longer active state duration.

Note that increasing the length of time that the unit 24 can accurately maintain GPS time while in a sleep state can help to increase the life of the main power source 47. More particularly, in such an embodiment, the duration of sleep states can be lengthened without requiring the position manager 52 to extract time data from the incoming satellite signal. As a result, position fixes may be performed less frequently and with short active state durations, thereby decreasing the power consumed from the main power source 47.

Figure 3:
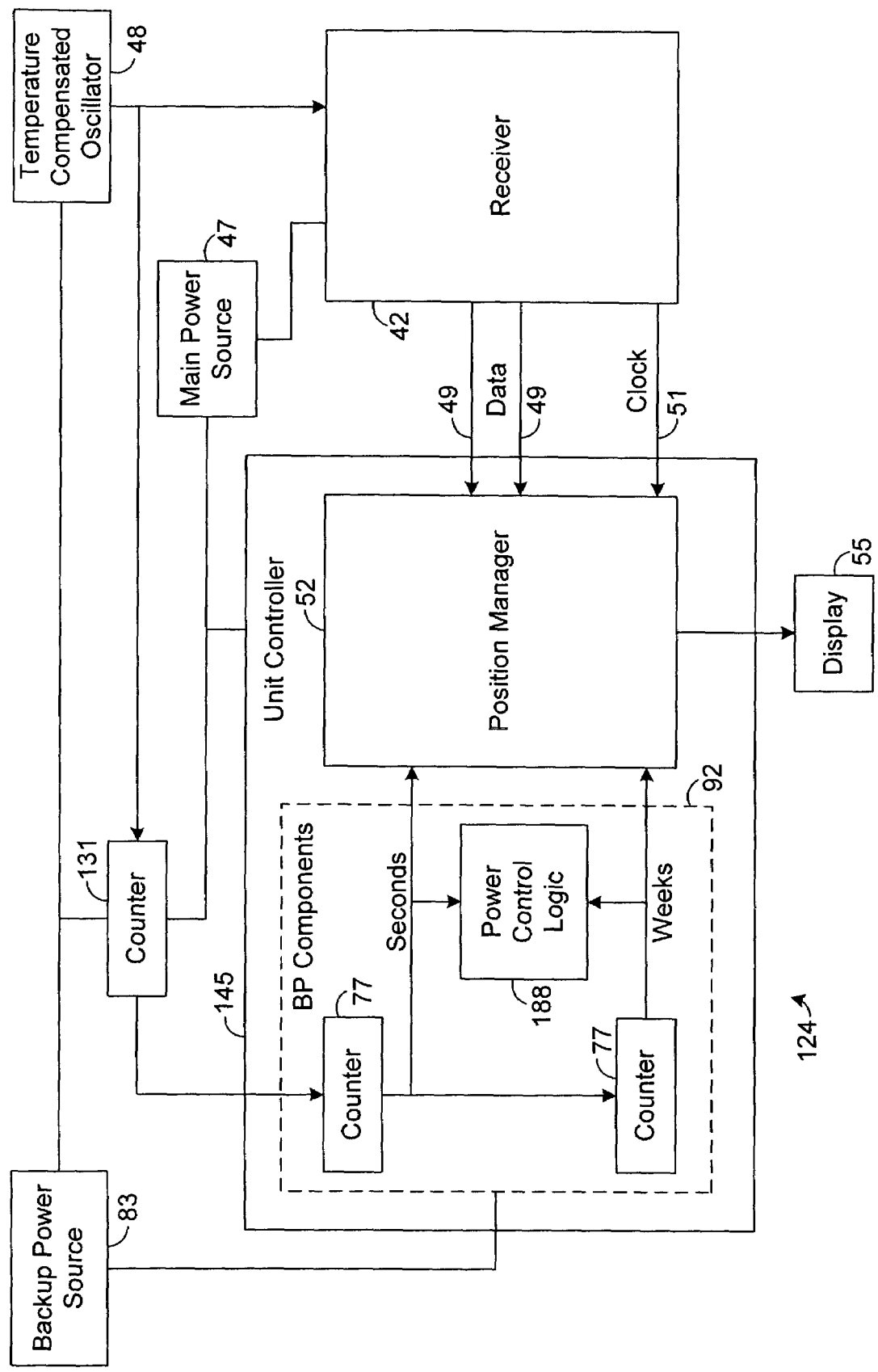
FIG. 3 is a block diagram illustrating a conventional GPS receiver unit that utilizes a temperature compensated oscillator to track GPS time.

FIG. 3 depicts a GPS receiver unit 124 in accordance with an exemplary embodiment of the present invention. The unit 124, similar to the receiver unit 24 described above, acquires an incoming satellite signal and extracts data provided by at least three satellites 22 to perform position fixes.

As shown by comparing FIGS. 2 and 3, the GPS receiver unit 124 of FIG. 3 may be similar in design to the conventional GPS receiver unit 24 of FIG. 2. Indeed, the GPS receiver unit 124 of FIG. 3 comprises a receiver 42 and a position manager 52 configured identical to the receiver 42 and position manager 52 of the conventional GPS receiver unit 24. Further, the unit controller 145 of FIG. 3 may be similar to the unit controller 45 of FIG. 2. However, the unit controller 145 of FIG. 3 preferably allows for a longer sleep state duration before requiring that the position manager 52 use, for a position fix, time data acquired from the incoming satellite signal in lieu of time data maintained by the unit 124.

In this regard, the time data maintained by the receiver unit 124 of FIG. 3 preferably remains precisely accurate for longer periods than the time data maintained by the receiver unit 24 of FIG. 2 due to the fact that the clock signal utilized to track GPS time remains precisely accurate for a longer sleep state duration. In this regard, rather than employing a low power real time clock 75 for generating a clock signal from which GPS time is to be based, the unit 124 preferably uses the clock signal of the temperature compensated oscillator 48 to maintain GPS time. More specifically, the clock signal from the oscillator 48 is preferably passed through a counter 131 that divides the frequency of the clock signal. In a preferred embodiment, the counter 131 divides the frequency of the clock signal such that the clock signal output from the counter 131 equals or is close to the frequency of the clock signal generated by the real time clock 75 of the receiver unit 24 depicted in FIG. 2 (i.e., 32768 Hz). As a result, the configuration of the components of the unit controller 145 need not be substantially changed from the configuration of the components of the controller 45 of FIG. 2. Indeed, it is possible to implement the unit controller 145 via the same IC chip used to implement the conventional controller 45.

Since the oscillator 48 is temperature compensated, the drift associated with the clock signal provided to counters 77 in FIG. 3 upon an initiation of a sleep state is significantly less pronounced than the drift associated with the clock signal provided to counters 77 in FIG. 2. Therefore, after initiation of a sleep state, the accuracy of the GPS time data maintained by the position manager 52 in the embodiment depicted by FIG. 3 remains within acceptable margins for a longer period of time than the accuracy of the GPS time data maintained by the controller 45 of FIG. 2. Indeed, it has been shown that, for an exemplary implementation according to the embodiment depicted by FIG. 3, the accuracy of the time data maintained by the unit controller 145 remains within about 0.25 ms accuracy for at least nine minutes, which is approximately three times longer than the duration of such accuracy described above for the GPS receiver unit 24 depicted by FIG. 2. Note that a different duration is possible depending on the overall configuration of the unit 124. However, for the purposes of illustration, assume that the accuracy of the time data maintained by the unit controller 145 remains within about 0.25 ms for nine minutes during a sleep state. Also assume that control logic 188 of the unit controller 145, therefore, uses nine minutes as a threshold for determining whether to use time data maintained by the unit 124 to perform a position fix and/or whether to initiate a transition to an active state, as will be described in more detail hereinafter.

Moreover, if a user invokes a transition from a sleep state to an active state within a time period when the accuracy of the unit's time data is within acceptable margins (e.g., such that the duration of the sleep state is less than nine minutes in the aforedescribed embodiment), the position manager 52 is preferably configured to perform a position fix without waiting for time data to be extracted from the incoming satellite signal. However, if a user invokes a transition from a sleep state to an active state within a time period when the accuracy of the unit's time data may be outside of acceptable margins (e.g., such that the duration of the sleep state is greater than nine minutes in the above mentioned embodiment), the position manager 52 is preferably configured to perform a position fix utilizing GPS timing information extracted from the incoming satellite signal.

Figure 4:
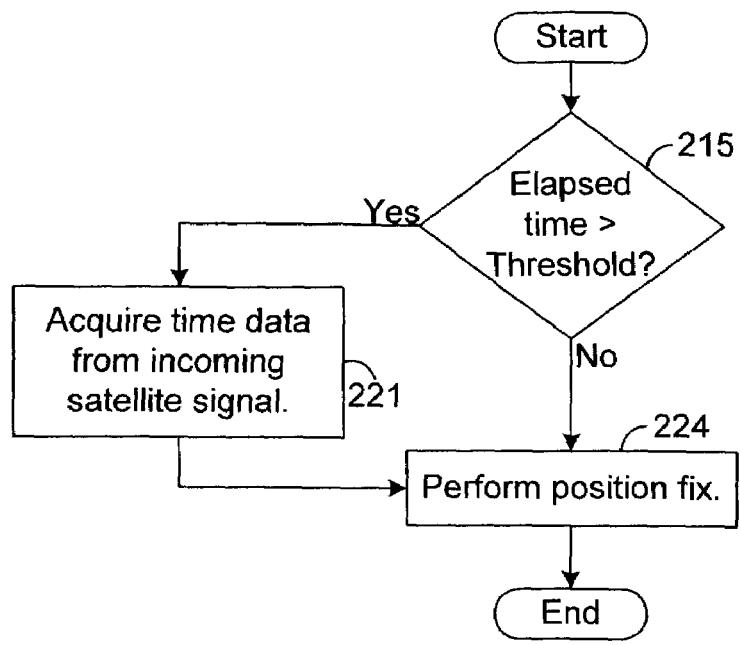
FIG. 4 is an exemplary awakening process implemented by a GPS receiver unit, such as is depicted in FIG. 3.

FIG. 4 depicts a flow chart describing an exemplary operation of the GPS receiver unit 124 when a user awakens the unit 124 from a sleep state. Note that the unit 124, whether awake or asleep, continues to track GPS time via the clock signal generated by the temperature compensated clock 48 and the counters 77 and 131. When awake or, in other words, in an active state, the main power source 47 preferably provides power to all of the other components shown by FIG. 3, except of course backup power source 83. When asleep, the main power source 47 is preferably switched off, and the backup power source 83 provides power to the clock 48, counter 131, and to the BP components 92.

When the GPS receiver unit 124 transitions to a sleep state, the position manager 52 preferably stores the GPS time, as indicated by the counters 77. When the GPS unit 124 is awakened, the position manager 52 preferably subtracts the current GPS time, as indicated by the counters 77, from the previously stored GPS time to determine the duration of the sleep state. This elapsed time is compared to a threshold in block 215 of FIG. 4. The threshold value preferably corresponds to an amount of time equal to or less than the period, which is nine minutes in the instant example, that GPS time is precisely maintained by the unit 124 within 0.25 ms during a sleep state. Note that other margins may be employed in other examples.

If the elapsed time exceeds the threshold, the position manager 52 preferably acquires the incoming satellite signal and extracts time data from the incoming satellite signal before performing a position fix, as shown by blocks 221 and 224 of FIG. 4. However, if the elapsed time is less than the threshold, the position manager 52 performs the position fix in block 224 based on the GPS time indicated by the counters 77 and, in particular, without waiting for extraction of time data from the incoming satellite signal. After a position fix is performed in block 224, the awakening process is complete, and the GPS receiver unit 124 may be operated in any desirable manner. For example, a user may request additional position fixes as desired, or the user may manually invoke a power-down placing the unit 124 back into a sleep state.

When the unit 124 is operating in a tracking mode, power control logic 188 controls the state of the unit 124 and periodically invokes position fixes, similar to the power control logic 88 of FIG. 2. Note that the power control logic 188 can be implemented in hardware, software, or a combination thereof. In addition, the power control logic 188 can lengthen the duty cycle of the unit 124, as compared to the duty cycle of the unit 24 of FIG. 2, since precise accuracy of GPS time is maintained for longer sleep state durations. In other words, the power control logic 188 can wait a longer amount of time, after a transition to a sleep state, before awakening the unit 24 and invoking a position fix. For example, in the above described embodiment, the power control logic 188 can awaken the unit 124 and invoke a position fix after approximately a nine minute sleep state without requiring the position manager 52 to acquire time data from the incoming satellite signal for the next position fix. As a result, fewer position fixes may be performed.

Figure 5:
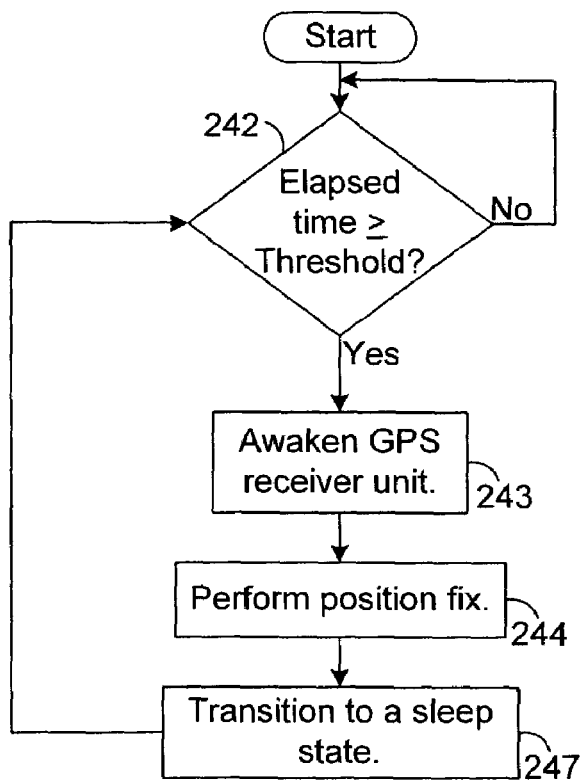
FIG. 5 is an exemplary process implemented by a GPS receiver unit, such as is depicted in FIG. 3, while operating in a tracking mode.

FIG. 5 depicts a flow chart describing an exemplary operation of the receiver unit 124 when operating in the tracking mode. Once the unit 124 is transitioned to a sleep state, the power control logic 188 begins tracking, based on the output of counters 77, the duration of the sleep state. Once the elapsed time or duration of the sleep state reaches a threshold (e.g., nine minutes in the instant example), the power control logic 188 awakens the unit 124 from the sleep state thereby invoking a position fix, as shown by blocks 242–244. Note that in performing this position fix, it is not necessary for the position manager 52 to wait for extraction of time data from the incoming satellite signal and may instead perform the position fix utilizing the GPS time indicated by the counters 77, thereby decreasing the amount of time required to perform the position fix. Upon performance of the position fix, the power control logic 188 may automatically invoke a transition of the receiver unit 124 back into a sleep state, as shown by block 247.

Note that, for the aforedescribed exemplary processes shown in FIGS. 4 and 5, it is assumed that valid ephemeris data for performing position fixes is stored within the receiver unit 124. If the GPS receiver unit 124 is not storing sufficient ephemeris data for performing a position fix, then the position manager 124 preferably waits until such ephemeris data is extracted from the incoming satellite signal before performing the position fix. As previously noted, the duration required to extract time data from an incoming GPS satellite signal is normally less than the duration required to extract ephemeris data. Therefore, if the position manager 52 is to extract ephemeris data before performing a position fix, the position manager 52 may utilize time data extracted from the incoming satellite signal rather than the time data maintained by the unit 124 to perform the position fix without adversely impacting the performance of the unit 124. In addition, the position manager 52 may utilize the extracted time data to recalibrate the GPS time maintained by the unit controller 45.

It should also be noted that the temperature compensated oscillator 48 may draw more power than the real time clock 75 of the conventional unit 24. Thus, utilizing the temperature compensated oscillator 48 may increase the power burden of the unit 24 during a sleep state. However, the power savings associated with increasing the amount of time that the unit 124 may remain in the sleep state while precisely maintaining GPS time may outweigh such costs.

Furthermore, the present invention has been described above as using a main power source 47 to provide power to components of the GPS receiver unit 24 during an active state and as utilizing a backup power source 83 to provide power to select components during a sleep state. However, other methodologies for providing power to the components of the receiver unit 24 are possible. For example, a single power source (e.g., main power source 47) may be configured to provide power during both active and sleep states. In this regard, the single power source may provide power to the various components of the unit 24 during the active state, and, during sleep states, the single power source may be used only to power selected ones of the components (e.g., components that enable the tracking of GPS time, as described above). Various other techniques of selectively providing power to various components, depending on the state of the unit 24, are possible in other embodiments.

In addition, it should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A global positioning receiver unit, having an active state and a sleep state, for use in a global positioning system (GPS), comprising:
   a temperature controlled oscillator configured to generate a clock signal; and
   a unit controller configured to track GPS time based on the clock signal while the receiver unit is in the sleep state, wherein, upon the receiver unit entering the active state from the sleep state, (i) if the duration of the sleep state from which the active state is entered is less than a threshold value, the unit controller performs a position fix based on a satellite signal and a GPS time tracked by the unit controller and (ii) if the duration of the sleep state is not less than the threshold, the unit controller performs the position fix without relying on the GPS time tracked by the unit controller.

2. The global positioning receiver of claim 1, further comprising:
   a first power source for powering the unit controller during the active state; and
   a second power source for powering a portion of the unit controller during the sleep state, wherein the unit controller portion is configured to track the GPS time.

3. The global positioning receiver of claim 1, wherein the unit controller is configurable to enter the active state when the duration of the sleep state exceeds the threshold value.

4. The global positioning receiver unit of claim 1, further comprising a counter configured to receive the clock signal and to output the clock signal at a reduced frequency, the counter further configured to transmit the clock signal, at the reduced frequency, to the unit controller.

5. A global positioning receiver unit for use in a global positioning system (GPS), comprising:
   temperature compensated means for generating a clock signal;
   means for tracking GPS time based on the clock signal while the receiver unit is in a sleep state;
   means for transitioning the receiver unit from the sleep state to an active state wherein transitioning includes comparing a configurable threshold value with a value indicative of time elapsed since a transition of the receiver unit to the sleep state;
   means for acquiring a satellite signal; and
   means for performing a position fix based on the satellite signal and a GPS time maintained in the tracking means, when the value indicative of time elapsed is less than the threshold value, and for performing the position fix based on the satellite signal without relying on the GPS time maintained in the tracking means, when the value indicative of time elapsed exceeds the threshold value.

6. A global positioning receiver unit for use in a global positioning system (GPS), comprising:
   a temperature controlled oscillator configured to generate a clock signal; and
   a unit controller configured to track GPS time based on the clock signal while the receiver unit is in a sleep state, the unit controller configured to determine a time value indicative of a duration that the receiver unit is in the sleep state, the unit controller configured to perform, if the time value is less than a threshold value, a position fix based on a satellite signal and the GPS time tracked by the unit controller, the unit controller further configured to perform, if the time value exceeds the threshold value, a position fix based on the satellite signal and time data determined from a sub-frame of the satellite signal.

7. The global positioning receiver unit of claim 6, further comprising a counter configured to receive the clock signal and to output the clock signal at a reduced frequency, the counter further configured to transmit the clock signal, at the reduced frequency, to the unit controller.

8. A global positioning method, comprising:
generating a clock signal via a temperature controlled oscillator within a global positioning receiver unit;
tracking global positioning system (GPS) time based on the clock signal while the receiver unit is in a sleep state;
determining a value indicative of an amount of time elapsed between a transition of the receiver unit to the sleep state and a transition of the receiver unit to an active state;
performing a comparison between the value and a threshold value;
acquiring a satellite signal, in an active state; and
in the active state, (i) when the value is less than the threshold value, performing a position fix based on the satellite signal and a GPS time tracked in the tracking step, and (ii) when the value exceeds the threshold value, performing the position fix based on the satellite signal without relying on the GPS time tracked in the tracking step.

9. The global positioning method of claim 8, further comprising adjusting a frequency of the clock signal.

10. The global positioning method of claim 8, further comprising allowing a configuration wherein the transition of the receiver unit to the active state is initiated when the value exceeds the threshold value.

11. A global positioning method for use on a global positioning receiver unit of a global positioning system (GPS), comprising:
generating a clock signal via a temperature compensated oscillator;
maintaining time data based on the clock signal while the receiver unit is in a sleep state; the time data indicative of GPS time;
determining a value indicative of a duration that the receiver unit is in the sleep state;
performing a comparison between the value and a threshold value;
acquiring a satellite signal; and
(i) performing a position fix based on the acquired signal and the maintained time data, when the comparison indicates that the value is less than the threshold value, and (ii) performing the position fix based on the acquired signal and without relying on the maintained time data, when the comparison indicates that the value is not less than the threshold value.

12. The global positioning method of claim 11, further comprising adjusting a frequency of the clock signal, wherein the time data is based on the adjusted frequency.

* * * * *